Oct. 12, 1965 E. GROHL 3,211,129
ELECTROSTATIC FLOCKING DEVICE INCLUDING VIBRATING ELECTRODE
Filed Jan. 8, 1963 3 Sheets-Sheet 1

Inventor
Edmund Grohl
By Stevens, Davis, Miller & Mosher
Attorneys

Oct. 12, 1965

E. GROHL 3,211,129

ELECTROSTATIC FLOCKING DEVICE INCLUDING VIBRATING ELECTRODE

Filed Jan. 8, 1963

Inventor
Edmund Grohl
By Stevens, Davis, Miller & Mosher
Attorneys

Oct. 12, 1965  E. GROHL  3,211,129
ELECTROSTATIC FLOCKING DEVICE INCLUDING VIBRATING ELECTRODE
Filed Jan. 8, 1963  3 Sheets-Sheet 3

Inventor
Edmund Grohl
By Stevens, Davis, Miller & Mosher
Attorneys

United States Patent Office 3,211,129
Patented Oct. 12, 1965

3,211,129
ELECTROSTATIC FLOCKING DEVICE INCLUDING VIBRATING ELECTRODE
Edmund Gröhl, Kirchstrasse 42, Heiningen, near Goppingen, Germany
Filed Jan. 8, 1963, Ser. No. 250,165
Claims priority, application Austria, Feb. 26, 1962, 1,593/62
5 Claims. (Cl. 118—638)

The invention relates to an arrangement for the production of material having a flocked surface, and more specifically to an arrangement for the production of such material by the electrostatic application of fibers to a carrier material having an adhesive layer for securing the fibers.

It is known to provide certain carrier materials, such as fabrics having relatively smooth surfaces, synthetic plastic sheets or paper, with a layer of fibers standing more or less perpendicularly, by providing the carrier material with an adhesive layer and introducing the carrier material into an electric field into which fibers are also introduced, the fibers being flocked onto the carrier material by the action of electrostatic forces, and retained on the carrier material by the adhesive layer. The electric field is in general formed between two large-surfaced electrodes of which one is arranged as a conducting member behind the carrier material and the other is arranged underneath a support carrying the flocking fibers. Furthermore, it has been proposed to use apertured grid-like electrodes which are arranged above the support which carries the fibers and introduces the same into the flocking device, the fibres being directed through the openings of the grid onto the carrier material to be flocked.

It has also been proposed, especially in connection with grid-like electrodes, to move the electrodes during the flocking, mainly by jolting or shaking the same, in order to prevent an undesired tree formation or beard formation of the fibers on the electrode and the resultant formation of an arc between the electrode and its counter-electrode. This shaking is effected with a low frequency of about 100 movements per minute, for example by a motor-driven eccentric rotating at a corresponding speed.

In connection with the hitherto used flocking devices, the surface characteristic of the fiber layer flocked onto the carrier material leaves much to be desired in many case however. This is especially the case when carrier materials with characteristically structured surfaces have to be flocked, for example woven goods, fleeces, profiled synthetic plastic sheets or the like, in which the form of the surface is determined for example by the form of the threads or the curvatures of the loop formations constituting the surface. With such carrier materials it has hitherto but not really been possible to carry out a flat and regular flocking.

It is an object of the invention to provide an improved flocking arrangement.

It is a further object of the invention to provide a flocking arrangement in which a uniform and dense flocking of a carrier material can be effected.

It is another object of the invention to provide a flocking arrangement in which the electrostatic application of a flocked covering on a carrier material is substantially uninfluenced by the surface nature of the carrier material.

It is yet another object of the invention to provide a flocking arrangement suitable for the uniform flocking of woven, knitted or profiled material.

It is still another object of the invention to provide a flocking arrangement by which uniform and dense flocking can be carried out, using long flocking fibers.

It is yet a further object of the invention to provide an arrangement for the production of material having a flocked surface by the application of fibers to a carrier material, the arrangement comprising an electrode for creating an electric field for directing the fibers onto the carrier material, the electrode being oscillatably mounted, means being provided for oscillating the electrode at a frequency above approximately 500 cycles per second during the flocking.

It has been found that the quality of a layer of fibers flocked onto a carrier material is dependent on the pattern of the lines of force of the electric field used. The course of the lines of force is determined by the constructive form of the flocking device, especially the electrodes, and with fixed electrodes is an invariable magnitude. It has now been found that the quality of the flocked layer of fibers can be essentially improved if the course of the lines of force continuously changes during the carrying out of the flocking, the speed of alteration of the lines of force being related to the speed of the fibers flying onto the carrier material.

It should be pointed out that the known slow shaking of the electrode cannot produce the effect given by the arrangement of the invention, namely the creation of a flock surface of great uniformity, since the hitherto used shaking frequencies amounted to only a few cycles per second and thus were much too low in comparison with the movement speed of the fibers.

These and other objects and advantages of the invention will be clear from the following description given with reference to the accompanying drawings which are given by way of example and in which:

FIG. 4 illustrates a pneumatic vibrator.

Figure 1:
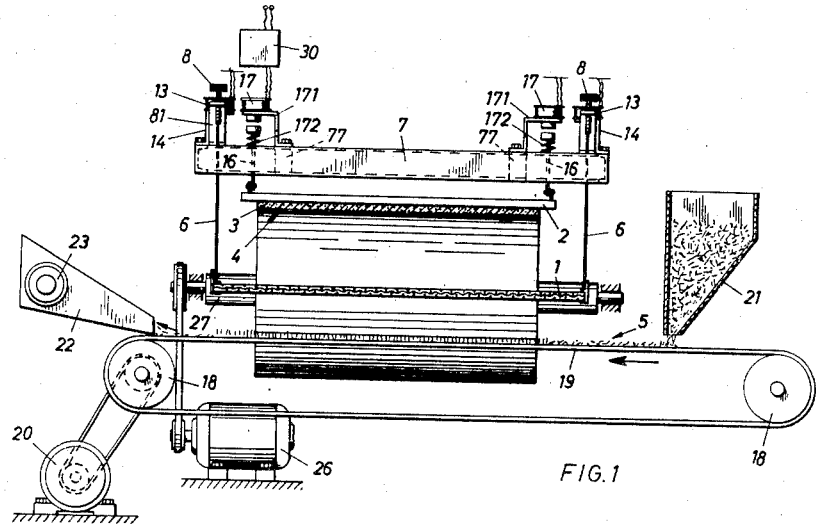
FIG. 1 is a front view of a flocking arrangement having an oscillating electrode.

The flocking arrangement comprises electrodes 1 and 2 between which an electric field is created by the application of direct current potentials to the electrodes. The polarity of the electrodes is not especially critical. Preferably the electrode 1 is connected to the positive pole of a heavy-duty high tension generator (not shown), whereas the electrode 2 has negative polarity and may be at earth potential. The voltage between the electrodes 1 and 2 may amount to 100,000 volts, but is preferably about 60,000 volts. The electrode 2 is advantageously formed as a solid metal plate, for example of hard brass, and serves for supporting and guiding a carrier material 3 provided with an adhesive layer 4, which is to be flocked.

In the illustrated embodiment of a flocking arrangement, the electrode 1 is of grid-like construction and is arranged between a deposit of flocking fibers 5 and the carrier material 3 to be flocked. The electrode 1 may however alternatively be arranged below the fibers 5, in which case the electrode 1 of course does not need to be of grid-like construction.

The grid of electrode 1 preferably consists of lozenge-shaped meshes of metal wire, and the meshes may have a height of between 5 to 15 mm. Metal wire with a thickness of about 0.2 mm. is suitable for forming the mesh.

Figure 3:
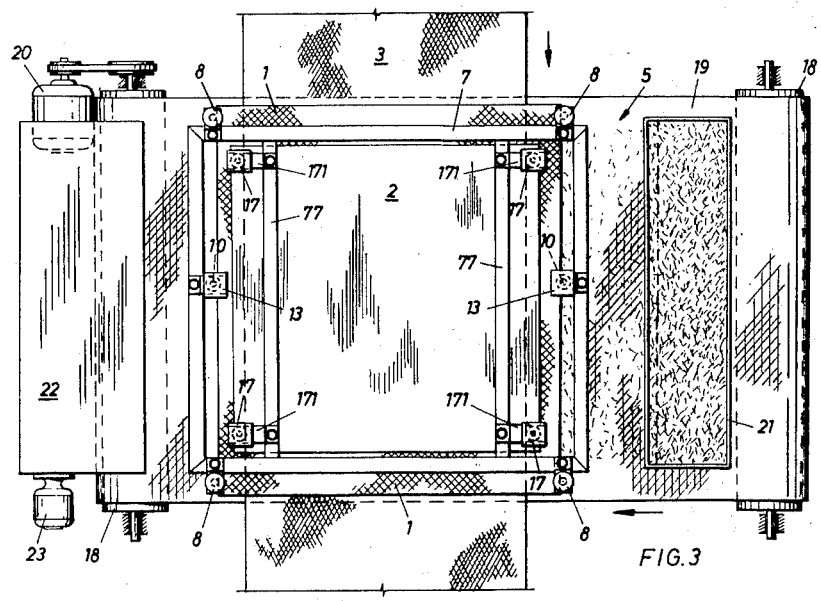
FIG. 3 is a plan view of the arrangement of FIGS. 1 and 2.

As seen from FIG. 1, the electrode 1 is suspended in pendulum-like manner on flexible threads 6 of cat gut or insulating synthetic plastic material, from a stationary frame 7. The frame 7 may consist of U-section rails (see FIG. 3) joined together in the form of a rectangle, and connected by two transverse struts 77. The frame 7 is rigidly supported by the floor or the ceiling of a room in which the flocking arrangement is provided. The threads 6 extend upwardly beyond the frame 7 and are connected with screws 8 which are adjustable in height, and mounted in brackets 81 on the frame 7. Consequently, the distance of the electrode 1 from the carrier material 3 to be flocked can be adjusted by rotation of the screws 8.

Two insulating studs 9 (only one of which can be seen in the drawings) extend from the electrode 1, and are linked to two rigid rods 10 which are guided upwards through the frame 7 and serve for introducing the oscillating movement to the electrode 1.

Since the vibration frequency must be relatively high, namely above about 500 cycles per second, preferably between about 1,000 and 10,000 cycles per second, the oscillation is advantageously effected by electromagnetic means, although alternatively pneumatic means may be used. As is diagrammatically illustrated in FIG. 2, the end of the rod 10 extending above the frame 7 is provided with an armature 11 which is spaced by a small distance from the core 12 of a solenoid 13 mounted by a bracket 14 on the frame 7. Similar provisions are made in connection with the other rod 10 which is not visible in FIG. 2. A spring 15 having a suitable spring constant, is inserted between each armature 11 and the frame 7. The solenoids 13 can be energised by an alternating current of suitable frequency by an oscillator 30, which is preferably adjustable in frequency, as diagrammatically illustrated in FIG. 2, and transfer corresponding oscillations onto the armatures 11 and through the rods 10 onto the electrode 1, which correspondingly vibrates with the same frequency. Due to the pendulum-like suspension of the electrode 1 on the threads 6, the oscillations of the electrode are effected not only perpendicularly to the plane of the electrode but also in the plane of the electrode itself.

The vibrators causing the oscillation of the electrode 1 can of course be constructed in other ways than illustrated, they may be in the form of electromagnetic or pneumatic diaphragm oscillators so long as they fulfill the function of placing the electrode into vibration with a suitably high frequency. In FIG. 4, a pneumatic vibrator 40 fed by compressed air is illustrated by way of example, is vibrating output plunger 40 being linked to the rod 10. By adjusting the air pressure the vibration frequency is adjustable in this case.

In general, a small amplitude of oscillation of about 0.1 mm. or less is sufficient. As previously mentioned, advantageously the frequency of operation of the vibrators is adjustable so that the required oscillation frequency of the electrode 1 can be suited to the conditions present, especially to the various speeds of flying of the fibers in the electric field and the various kinds of fibers which may be used.

The suspension points of the electrode 1 on the threads 6, and also the insulating studs 9 with the rods 10 are preferably arranged at the margin of the electrode 1, so that the introduction of the carrier material 3 and also the electrode 2 are not impeded. The screws 8 visible in FIG. 2 lie in front of and behind the vibrators 13, referred to the plane of the drawing of FIG. 1, as can be clearly seen from FIG. 3. As mentioned above, the electrode 1 is adjustable in height by means of the screws 8. It is clear that in this case also the rods 10 must be arranged for being lengthened or shortened, as for example can be achieved by a telescopic formation of the same. Measures of this kind are apparent to any person skilled in the art and accordingly do not require to be elaborated here in detail.

As can be furthermore seen from the figures, also the upper electrode 2 can be placed in oscillation. For this, purpose, rods 16 are likewise linked to its upper surface, which are acted on by vibrators 17 in the same or similar manner as the rods 10 of the electrode 1, and transfer the oscillation onto the electrode 2. The vibrators 17 are supported on brackets 171 on the transverse struts 77 of the frame 7. If the vibrators 17 are not in operation, springs 172 hold the electrode 2 in resilient connection with the frame 7. If oscillation of the electrode 2 is not desired, then the electrode 2 can of course be alternatively rigidly fixed on the frame 7. The oscillation frequency of the electrode 2 can be selected lower than the oscillation frequency of the electrode 1, it being sufficient if the frequencies of these electrodes are related as 1:2. The oscillation of the electrode 2 also mainly serves for continuously varying the pattern of the lines of force of the electric field betwen the electrodes 1 and 2 during the flocking.

The operation of the arrangement described is effected in the following manner: The flocking material fibers 5 are introduced into the region below the electrode 1, as is illustrated in FIG. 1, by a feeding device having an endless conveyor belt 19 with a metallised surface, the conveyor belt 19 being guided over rollers 18 driven by a motor 20. The fibers 5 are uniformly distributed on the conveyor belt 19 by a feeding hopper 21. Superfluous fibers, not taken up by the electric field, are sucked up by an extractor 22 driven by a motor 23 and can be transferred again into the feeding hopper 21.

The electrode 1 lying at high tension, creates an electrostatic field whereby the fibers 5 are lifted from the conveyor belt 19, directed through the mesh of the grid and guided into the adhesive layer 4 on the carrier material 3.

Figure 2:
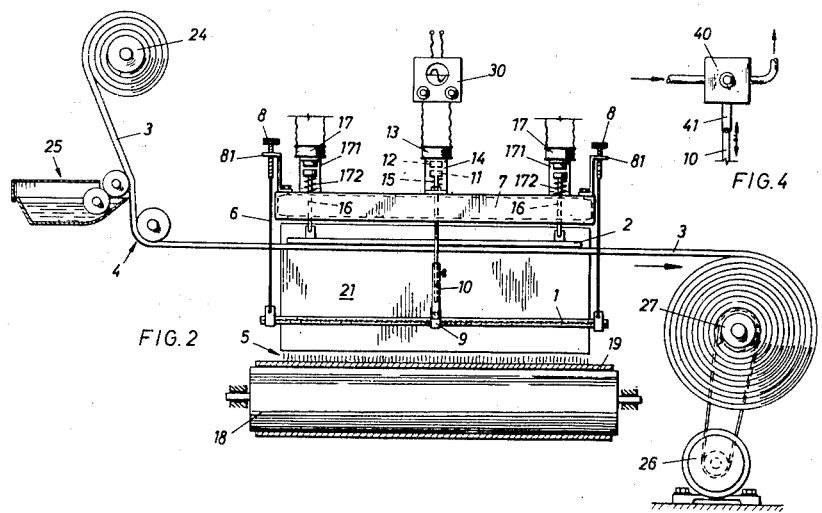
FIG. 2 is a side view of the arrangement of FIG. 1.

As seen from FIG. 2, the carrier material 3 in the present case is a relatively wide band which is drawn from a roll 24 and is provided with a thin adhesive layer 4 on the underside by an adhesive-material applying device 25. After the introduction of the fibers into the adhesive layer in the electric field between the electrodes 1 and 2, the adhesive material is hardened in known manner so that the fibers 5 are fixedly anchored onto the carrier material 3. The provision of the adhesive layer 4 can possibly be avoided if the fibers 5, for example by exchanging appropriate chemical groups, are directly secured onto a support of suitable synthetic plastic material. After leaving the flocking arrangement, that is to say after moving out of the eletcric field formed between the electrodes 1 and 2, the now flocked carrier material 3, possibly after passing through a hardening device (not illustrated) is rolled onto a second roller 27 driven by a motor 26.

As seen from the figures, the running directions of the conveyor belt 19 and of the carrier material 3 are at right angles to each other. Although in the present case a continuously moving carrier material is flocked, the flocking can of course be effected onto a stationary carrier material held on the electrode 2. Furthermore, the direction of flying of the fibres, may take place in known manner from above downwardly, that is to say in the direction of the force of gravity, instead of as illustrated.

During the flocking procedure, the electrode 1 is displaced with the described rapid oscillation by means of the vibrators 13, and if desired also the electrode 2 is displaced by means of the vibrators 17.

As mentioned already, materials flocked with the aid of electrodes placed in rapid oscillation in accordance with the invention are distinguished with regard to a uniform and clean fibrous application in a surprising way from materials flocked by the usual methods, that is to say without rapid vibration of the electrodes. As likewise already indicated, this is presumably based on the fact that during the flocking the field distribution between the electrodes is continuously changed in a rapid rhythm matched to the flying speed of the fibers.

In particular, by means of the rapid vibration of the electrode 1, a differential charging of the fibers 5 appears to be effected, which has shown itself to be favourable for the engagement of the same in the adhesive layer 4. The differential charging may be based on the fact that the fibers flying through the mesh of the electrode 1 from the conveyor belt 19 onto the carrier material 3, spend different lengths of time in the vicinity of the electrode, depending on whether the electrode happens to be moving in phase or in anti-phase with the fibers. It can be recognised from this that the vibration frequency of the electrode must be adapted to the movement speed of the fibers, and that a slow shaking of the electrode cannot cause the effect given by the arrangement of the invention.

The arrangement described here is especially suitable for the use of long flocking fibers and for the flocking of woven products or profiled synthetic plastic surfaces, it being possible to achieve an application of fibers onto carrier materials of such nature, with a velvet-like lustre and density and uniformity not realised hitherto.

Many modifications, additions, omissions or alterations to the embodiment specifically described herein may be effected within the spirit and scope of the present invention, as defined in the following claims.

I claim:

1. In an arrangement for the production of flocked material in an electric field, a fixed frame, a first electrode, a second electrode having openings therein and spaced apart from said first electrode, means for electrically charging said electrodes at opposite polarity to create an electric field therebetween, a carrier material having an adhesive layer, means for introducing said carrier material into the space between said electrodes with said adhesive layer facing said second electrode, said first electrode being stationary and in guiding contact with the carrier material, means for introducing fibers beneath said second electrode whereby said fibers are moved upward through said openings under the influence of said electric field, a first mounting which connects said first electrode with said frame, a second mounting which supports said second electrode below said frame and said first electrode, said second mounting comprising a plurality of spaced flexible threads having their upper ends connected to said frame and having their lower ends connected to said second electrode, whereby said second mounting enables said second electrode to have a swinging movement with at least a vertical degree of freedom as well as a degree of freedom within the plane of the electrode itself, at least one rigid rod member having a lower end connected to said second electrode and an upper end extending through said frame, and vibrating means connected to but not supporting the other end of said rod for placing the second electrode in random oscillation with an amplitude of approximately 0.1 mm. and with a frequency of oscillation lying above 500 cycles per second.

2. An arrangement according to claim 1, wherein said vibrating means comprises a pneumatic oscillation generator.

3. An arrangement according to claim 1, wherein said vibrating means comprises a solenoid having a core, an oscillator for feeding said solenoid with an electric alternating current of a frequency above 500 cycles per second. said upper end of said rigid rod member comprising an armature arranged at a predetermined distance from said core.

4. An arrangement according to claim 3, wherein said oscillator is adjustable and has a frequency range of approximately 1,000 to 10,000 cycles per second.

5. An arrangement according to claim 3, further comprising adjustable connecting members mounted on said frame, each said connecting member being adjustable and connected to the upper end of one of said threads so that said adjusting members are adapted to selectively vary the vertical position of said threads, and wherein said rigid rod member has two parts axially movable with respect to each other and a locking member for locking said parts in a relative fixed position, whereby the effective length of said rigid rod member is adapted to be varied.

References Cited by the Examiner

UNITED STATES PATENTS

| 2,173,032 | 9/39 | Wintermute | 117—17 |
| 2,173,078 | 9/39 | Meston | 117—17 |
| 2,174,328 | 9/39 | Meston et al. | |
| 2,218,445 | 10/40 | Wintermute | 117—17 |
| 2,551,035 | 5/51 | Miller | 117—17 X |
| 2,686,733 | 8/54 | Burridge et al. | 117—17 |
| 2,976,839 | 3/61 | Okma et al. | 118—640 X |

FOREIGN PATENTS 1,078,990   5/54   France.

MORRIS KAPLAN, *Primary Examiner.*

RICHARD D. NEVIUS, CHARLES A. WILLMUTH,
*Examiners.*